United States Patent [19]
He

[11] Patent Number: 6,105,048
[45] Date of Patent: *Aug. 15, 2000

[54] APPARATUS AND METHOD FOR THE REAL-TIME PROCESSING OF A PLURALITY OF TASKS

[75] Inventor: Xiaoyong He, Vienna, Austria

[73] Assignee: Siemens Aktiengesellschaft, Munich, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/698,729

[22] Filed: Aug. 16, 1996

[30] Foreign Application Priority Data

Aug. 18, 1995 [DE] Germany ............... 195 30 483

[51] Int. Cl.[7] ............................................ G06F 9/00
[52] U.S. Cl. ................................. 709/100; 709/103
[58] Field of Search ........................ 395/670, 673; 709/100, 102, 103, 105, 108

[56] References Cited

U.S. PATENT DOCUMENTS

| | | |
|---|---|---|
| 4,084,228 | 4/1978 | Dufond et al. . |
| 4,642,756 | 2/1987 | Sherrod . |
| 5,185,861 | 2/1993 | Valencia ................. 395/200 |
| 5,379,428 | 1/1995 | Belo ........................ 395/650 |
| 5,465,335 | 11/1995 | Anderson ................ 395/375 |
| 5,606,695 | 2/1997 | Dworzecki ............... 395/208 |
| 5,630,130 | 5/1997 | Perotto et al. ........... 395/677 |

FOREIGN PATENT DOCUMENTS 9 415 515 A2  6/1991  European Pat. Off. .
0 553 588  4/1993  European Pat. Off. .

OTHER PUBLICATIONS

Prozebrechner: statische und terminorientierte Prioritaten im Vergleich—Elektron, 20 (1978), H.6.S. 283–289.
Implementation and Evaluation of a Time–Driven Scheduling Processor—Wendorf—1988 IEEE.
Scheduling Algorithms for Multiprogramming in a Hard Real–Time Environment—C. L. Liu—vol. 20, No. 1 Jan. 1973, pp. 46–61.
"Operating Systems A Systematic View" Davis, William S. Addison–Wesley Publishing Company, 1987.
Liu, C.L., "Scheduling Algorithms for Multiprogramming in a Hard–Real–Time Environment", 1973.
Proceedings Real–Time Systems Symposium—Dec. 2–4, 1986—Fairmont Hotel New Orleans, Louisiana.

*Primary Examiner*—Majid Banankhah
*Attorney, Agent, or Firm*—Hill & Simpson

[57] ABSTRACT

An apparatus and a method for the processing of a plurality of tasks by a processor of a real-time data processing installation, in which each task is dynamically allocated a priority according to its urgency, after which the tasks are processed by a processor. For this purpose, for each task to be processed, the generation of an initiation cell having a number of t- and i-bits is provided, as is the entering of this initiation cell into a free cell of a contention unit. The time sequence information contained in the t-bits of all cells of the contention unit are compared with one another in order to determine the task containing the smallest time sequence information. In case the determined task does not agree with the previously determined task, an interrupt signal is sent to the processor in order to introduce the processing of this newly determined task.

20 Claims, 4 Drawing Sheets

APPARATUS AND METHOD FOR THE REAL-TIME PROCESSING OF A PLURALITY OF TASKS

BACKGROUND OF THE INVENTION

The present invention relates to an apparatus and a method for the processing of a plurality of tasks in a processor of a real-time data processing installation in which each task is to be processed individually by the processor according to a dynamically allocated priority and within a predetermined time period.

In a real-time system of the type named above having a dynamic priority allocation, the priority of a task or of an interrupt is assigned according to the relative urgency, in relation to the time at which a task is available for processing or an interrupt is requested.

In many of the previously used systems, a static priority allocation is used for tasks and interrupt requests that does not change over the course of time. In order to enable the timely processing of all tasks in such a system with n independent periodic tasks, the utilization of processor capacity may not exceed the theoretical value of $n(2^{1/n}-1)$. For large n, this value converges rapidly to ln2=0.69. That is, the utilization of processor capacity in such a system can be a maximum of only 70%, and the processor requires at least 30% idle time in order to be able to process all tasks in a timely fashion.

For the improvement of the utilization of the processor capacity, and thus of the performance of the data processing apparatus as a whole, the realization of a dynamic priority allocation has already been tried. A theoretical foundation for such a dynamic priority allocation, with which a processor capacity utilization of 100% can be achieved, can be found in the article entitled "Scheduling Algorithms for Multiprogramming in a Hard Real-Time Environment," in: Journal of the Association for Computing Machinery, vol. 20, January 1973, pp. 46–61. An algorithm for a priority allocation designated Earliest Deadline First (EDF) is therein described. According to EDF, of all the tasks awaiting processing, the one for which the time period for its processing expires the earliest receives the highest priority. In the article named, among other things there is also a comparison of the theoretical performance of a system having a static priority allocation with one having a dynamic priority allocation, and also a comparison of these systems with a mixed priority allocation.

Although with a dynamic priority allocation according to EDF a utilization of processor capacity of 100% can be achieved, the performance of the system is not improved, since the processor must additionally process the algorithm for the priority allocation. In practice, it has turned out that in some cases the algorithm for the priority allocation causes an overhead of up to 80% of the processor time, so that only 20% of the processor time is available for the actual processing of the tasks.

A reduction of the utilization of processor capacity by the processing of the priority allocation algorithm can be prevented by providing an additional processor for processing the priority allocation algorithm, the additional processor being exclusively responsible for this task. A solution variation of this type can be found in the article "Implementation and Evaluation of a Time-Driven Scheduling Processor," in: EEE Transactions on Computers, 7/88, p. 172ff.

With this system, it is possible to obtain 98% of the processor time for the processing of tasks. However, a solution of this type has the disadvantage that the hardware expense increases considerably, and the system is thus too expensive for many applications.

SUMMARY OF THE INVENTION

It is an object of the present invention to create a method and an apparatus in which the utilization of processor capacities with the use of a dynamic priority allocation according to EDF, in an apparatus without an additional processor, can be substantially increased in relation to known systems. Such a solution should also be able to be realized without high expense.

The above task is solved, according to the invention, by means of a method for processing a plurality of tasks by a processor of a data processing apparatus, in which each task is to be processed according to a dynamically allocated priority individually and within a predetermined time period. The method comprises the following steps:

the generation of an initiation cell for each task to be processed, said cell having a plurality of t-bits, which contain time sequence information, and a plurality of i-bits, which contain an index information, and the entering of the generated initiation cells into a free cell of a contention unit, in which such a cell is allocated to each task to be processed by the processor; and comparison of the time information contained in the t-bits of all cells of the contention unit, in order to newly determine that task which contains the smallest time sequence information, and, if warranted, the transmission of an interrupt signal to the processor in order to introduce the processing of the newly determined task, in case the newly determined task does not agree with a previously determined task just being processed by the processor.

Likewise, the posed task is solved by means of an apparatus for the processing of a plurality of tasks by a processor within a predetermined time period according to a dynamically allocated priority, in which apparatus, for an external task to be processed, means are provided for the generation of an initiation cell, consisting of at least a plurality of t-bits, which contain a time sequence information, and of a plurality of i-bits, which contain an index information. The apparatus additionally comprises means for entering the initiation cell of each task to be processed into a contention unit (PCU), in which a plurality of contention cells is provided for this purpose, and also comprises means for the comparison of the time information contained in the t-bits of all cells of the contention unit, in order to determine the task that contains the earliest expiring time information. Means are also provided for the transmission of an interrupt signal to the processor, in order to introduce the processing of the newly determined task, in case the determined task does not agree with the previously determined task just being processed by the processor. The time sequence information contained in the t-bits indicates, in the standard way, the time within which the processing of the task has to occur, while the index information contained in the i-bits refers to the task control block of the data processing apparatus.

By means of this method or the apparatus, it is possible to considerably improve the utilization of the capacity of the processor, since the processor does not have to process any overhead code for the priority allocation. The processor can thus be loaded with tasks up to the theoretical limit of 100%. The hardware expense for the contention unit is extremely low in comparison with an additional processor. A contention unit can, for example, comprise a simple static RAM memory block or simple binary counters, in which the contention cells are stored.

In an embodiment of the method or of the apparatus, the initiation cell is advantageously generated by means of a process initiation unit, in which, for each admitted external event that triggers a task for processing by the processor, an initiation cell with t- and i-bits that are pre-coded or initiated by the processor is contained. It is further provided within the scope of the invention that for an internal task to be processed, e.g. a subtask, the t- and i-bits are generated for a contention cell by the processor and are entered into the contention unit.

In addition, it is advantageous within the scope of the invention if an r-bit in each cell of the contention unit indicates whether or not it is occupied. This r-bit is always checked before the entering of a cell into the contention unit, in order to be sure that the provided cell is not already occupied by an entry for another task. If the associated task is ended, this r-bit is reset so as to indicate a free cell.

In addition, it has proven advantageous if each cell of the contention unit additionally contains f-bits that are provided for an intertask communication, e.g. semaphore, event flags or message boxes, by means of which the participation of a contention cell in the comparison of the time sequence information contained in the t-bits can be temporarily suppressed. If a task must await a particular precondition, an f-bit is set in the contention cell of this task, in order to exclude it temporarily from the comparison of the time sequence information contained in the t-bits. If the preconditions for the further processing of these tasks are fulfilled, the f-bit of the allocated contention cell is reset, so that this cell can subsequently take part again in the comparison of the t-bits. In this way, an active and an inactive state of a contention cell can be represented in a simple way.

A particularly advantageous embodiment of the method of the invention results in that the value of an upwardly counting counter is added to the relative time information contained in the t-bits of an initiation cell before the entering of this cell into the contention unit, in order to generate an absolute time information, which is represented by the t-bits of the contention cell. Since only absolute time information remains stored in the contention cell, only these entries need to be compared among one another in order to determine which task contains the smallest time sequence information.

Advantageously, the comparison of the time sequence information of the active contention cells occurs only if the state of the r- and f-bits of at least one of the contention cells has changed. That is, the comparison is carried out only if a contention cell is newly entered into the contention unit or is erased from this unit, or if the participation of a contention cell in the comparison of the time sequence information is suppressed or again admitted. However, independently of the state of the r- and f-bits of the contention cells, a comparison of the time sequence information of all occupied contention cells (active and inactive cells) is additionally carried out periodically, in order to indicate an overloading as soon as the value of the determined smallest time sequence information is smaller than that of the counter. This overloading safeguard serves to activate routines in the case of a processor loading of over 100% that enables a safe further running of the data processing even in this case. Via this interrupt routine, an endless loop can likewise be processed.

In the scope of the present invention, a distinction is thus made in the following way between relative and absolute time sequence information. A relative time information indicates a time interval, e.g. 15 ms, within which the processing of the task must be ended at the latest. In the preferred exemplary embodiment further specified below, such a relative time sequence information is contained among other things in the t-bits of the initiation cell. For simplification, the relative time sequence information can also be represented indirectly by means of a binary value, e.g. a number of clock periods of a binary counter, which serves as a time indication. On the other hand, an absolute time information indicates a time, e.g. 10 h 15' 45" 01 ms, by which the processing of the task must be completed at the latest. An absolute time information of this type can of course also be realized independently of the time of day, by means of an upwardly counting counter. In this preferred exemplary embodiment, an absolute time information of this sort is contained in the t-bits of the contention cell. Due to the fact that upon the entry of a cell into the contention unit, the relative time information is converted into an absolute time information, the t-bits of the contention cells advantageously do not have to be renewed after each clock cycle.

In the following, the present invention is explained in more detail on the basis of a concrete, non-limiting exemplary embodiment.

DESCRIPTION OF THE PREFERRED EMBODIMENT

Figure 1:
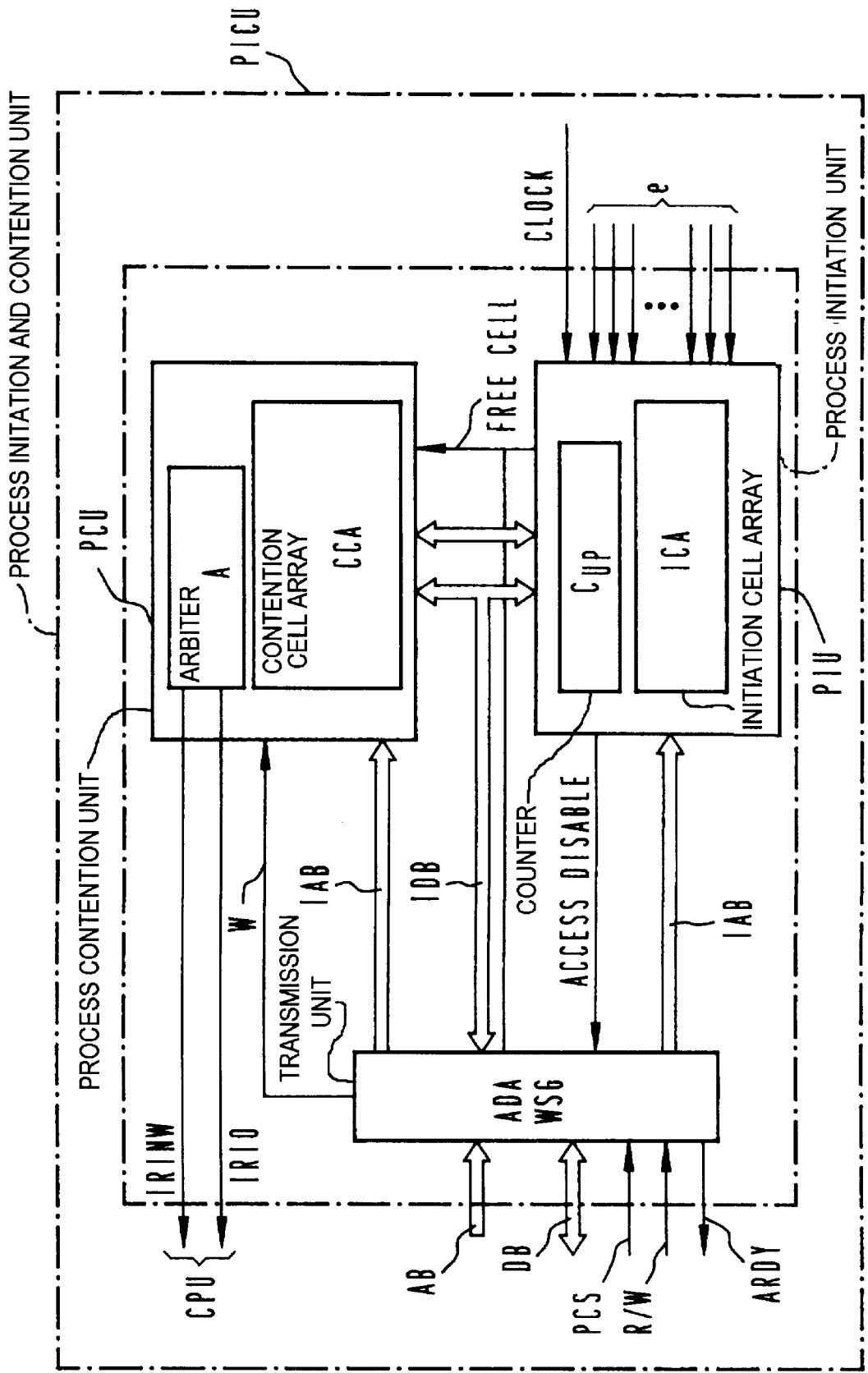
FIG. 1 is a schematic block diagram of an apparatus of the invention with the initiation unit and the contention unit.

Reference is made first to FIG. 1, in which an apparatus PICU (Process-initiation and Contention-Unit) of the inventive type is schematically represented, in which a process initiation unit PIU (Process Initiation Unit) and a contention unit PCU (Process Contention-Unit) are contained.

A plurality of signal lines are connected to the process initiation unit PIU, which respectively represent one external event by means of which a particular task can be signaled for processing by the processor CPU (here not shown). For this purpose, the process initiation unit comprises for each external event signal respectively one initiation cell IC (Initiation Cell), which are all combined into an array ICA (Initiation Cell Array). Each initiation cell IC contains: a determinate number of bits, namely a number n of t-bits, which indicate a relative time information for the corresponding task, within which time interval the task is to be processed at the latest by the processor CPU in order to satisfy the requirements of the real-time processing; a plurality of i-bits, which form an index that refers to the task control block TCB of the data processing apparatus, where further information for the processing of the respective task is stored; and a plurality of f-bits, which are used as flags, e.g. for inter-task communication. The t-bits can already be pre-coded for each possible task in the array ICA or can be written in the array ICA at the startup of the data processing equipment. The i-bits are written in the allocated cell in the initiation phase of a task by the processor CPU. In addition, in the process initiation unit PIU an upwardly counting, n-bit-wide counter $C_{UP}$ is provided, whose content is added to the content of the t-bits of an initiation cell IC, before this cell is entered into the contention unit PCU, in order to generate an absolute time information that indicates by what time, reckoned from its initiation, this task is to be processed by the processor at the latest. The counter $C_{UP}$ is clocked by an external clock CLOCK.

The contention unit PCU of the apparatus PICU comprises a plurality of contention cells CC (Contention Cell), which are likewise combined into an array CCA (Contention Cell Array). The number of cells CC in the contention unit PCU and the number of cells IC in the process initiation unit PIU are independent of one another. Each contention cell CC comprises a determinate number of bits, namely a number n+1 of t-bits, which contain the absolute time information obtained by means of addition with the counter $C_{UP}$, (by which time the task is to be processed), all i-bits and f-bits of the initiation cell, and, in addition, an r-bit that indicates whether the allocated contention cell is free or occupied. In the present exemplary embodiment, the number and the content of the t-bits of the initiation cell and the t-bits of the contention cell are different, since the t-bits in the initiation cell IC contain a relative time information, whereas the contention cell contains an absolute time information obtained by addition of the relative time information with the momentary value of the counter $C_{UP}$. In the represented exemplary embodiment, the contention unit also comprises an arbiter A, which carries out a comparison of the time sequence information stored in the t-bits of the occupied contention cells CC, in order to determine that cell whose time sequence information has the lowest value. A more precise specification of the function of this arbiter is made below in reference to FIGS. 3 and 4. The arbiter A is connected with the processor CPU of the data processing equipment by means of an interrupt signal line IRINW (Interrupt Request Indicating New Winner) and an interrupt signal line IRIO (Interrupt Request Indicating Overloading).

In the present preferred exemplary embodiment with the counter $C_{UP}$, both the process initiation unit PIU and the contention unit PCU can be manufactured analogously to a statistical RAM. Since a smaller number of transistors is required for this purpose, a simplified, economical manufacturing of the apparatus results, in comparison with standard binary counters. However, the present invention is in no way limited to this exemplary embodiment. All other process initiation units and contention units suited for this purpose are also provided within the scope of the invention.

The process initiation unit PIU is connected with the contention unit PCU of the apparatus PICU via a line FREE CELL and an internal data bus IDB (Internal Data Bus). With the FREE CELL line, it is checked, with the auxiliary aid of the r-bit of the contention cells CC, whether such a cell of the contention unit is available for an entry, i.e. it is determined whether it is free or occupied. Via the internal data bus IDB, the t-, i- and f-bits can be transmitted from the PIU to the PCU.

For the communication with the processor CPU of the data processing apparatus, a transmission unit ADAWSG (Address Decode And Wait State Generation unit) is provided, which is connected to the internal address and data bus on the one hand and to the CPU address and data bus on the other hand. In addition, the transmission unit ADAWSG has an access to the line FREE CELL. The process initiation unit PIU is connected with the transmission unit ADAWSG via a signal line ACCESS DISABLE, in order to prevent the processor CPU from accessing the contention unit PCU during the initiation or the entering of a cell by the process initiation unit PIU. The signal of the line ACCESS DISABLE is converted by the transmission unit ADAWSG into a signal that leads to the ARDY input (Asynchronous Ready) of the processor CPU. In addition, the transmission unit is connected to the outputs PCS (Peripheral Chip Select) and R/W of the processor.

The number of bits of the internal address bus of the apparatus PICU is divided into two segments, namely into a segment c, by which the cells in the process initiation unit or the contention unit are addressed, and a segment s, by which the partial regions within a cell (t-bits, i-bits, f-bits) are addressed. The address bus to the CPU can also be divided into two segments in this way, namely into a segment c and a segment s.

Figure 2:
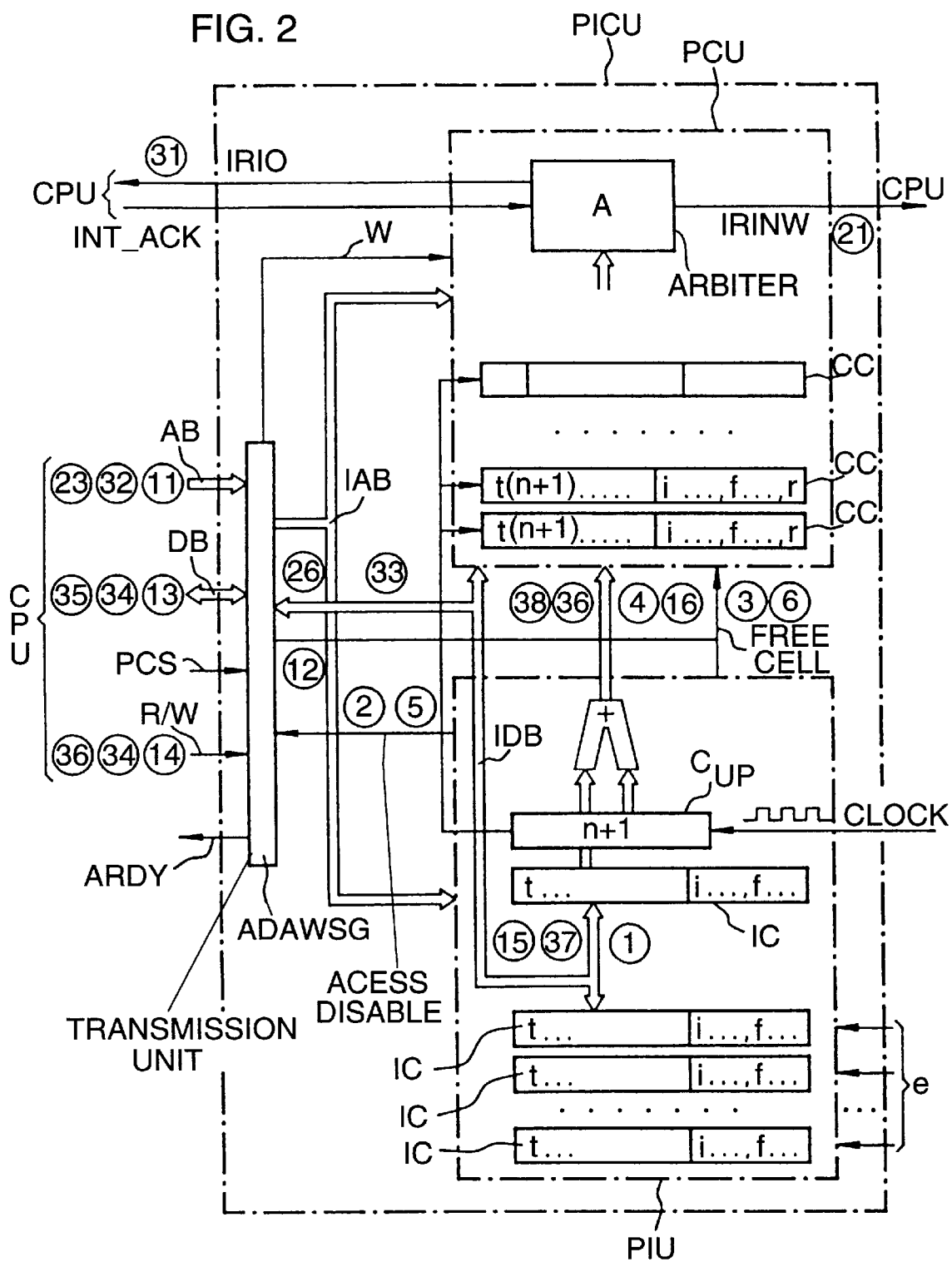
FIG. 2 is a block diagram of the apparatus according to FIG. 1 in which individual procedural sequences are identified with numbers.

In the following, typical method sequences of the above-specified apparatus are explained in more detail with reference to FIG. 2, on the one hand for case A), in which an external event signals the processing of a task, and on the other hand for the case B), in which a subtask is generated by the processor. The numberings indicated in brackets in the following correspond to the numbers indicated in FIG. 2.

A) After the application of an external event, e.g. event e, to one of the signal lines provided therefor of the process initiation unit PIU, the following operational steps are carried out:

(1) The n pre-coded t-bits of the initiation cell IC provided for the requested task are loaded into an adder register.

(2) At the transmission unit ADAWSG, the signal ACCESS DISABLE is set so that the processor CPU receives no access to the contention unit PCU until the initiation of the requested task is ended. If a PCS signal from the CPU arrives at the unit ADAWSG, the ARDY signal is set, as a reaction, to the signal ACCESS DISABLE by the ADAWSG unit.

(3) At the same time, the signal FREE CELL is set by the process initiation unit, in order to enable the carrying out of the subsequent writing processes at an empty contention cell (with reset r-bit).

(4) The value contained in the n t-bits for the time sequence is added to the content of the n-bit-wide counter $C_{UP}$. The addition yields an n+1 bit result, which represents an absolute time information that is written into the n+1 t-bits of the free contention cell. The content of the i-bits and of the f-bits of the initiation cell is written unaltered into the corresponding i- and f-bits of the contention cell.

(5) The signal ACCESS DISABLE is subsequently reset by the process initiation unit PIU, in order to again clear an access to the contention unit by the processor CPU. If a PCS request was present in the meantime, the ARDY signal is reset by the transmission unit ADAWSG.

(6) Likewise, the signal FREE CELL is reset by the process initiation unit PIU.

(B) In the case of the presence of an internal event, i.e. if a task is requested by another task, the following steps are carried out:

(11) A reserved code is applied to the address bus of the processor CPU, e.g. 0xFF in segment c, in order to indicate that a free cell is requested. Likewise, a pointer is applied to the t-bits in the segment s of the address bus.

(12) The transmission unit ADAWSG thereupon generates a FREE CELL signal, which is applied to the FREE CELL input of the contention unit, insofar as the signal ACCESS DISABLE is not displayed at the unit ADAWSG.

(13) The value of the t-bits is applied to the CPU data bus.

(14) The WRITE signal is set at the R/W input of the ADAWSG unit.

(15) The content of the n t-bits is loaded into the adder register of the process initiation unit PIU. In case the number of t-bits is larger than the width of the data bus, the steps (11) to (15) are repeated until all n t-bits are loaded into the adder register.

(16) The n t-bits are added with the content of the n-bit-wide counter $C_{UP}$ to form a result that is written into the n+1 t-bits of a free cell. The i- and the f-bits are written directly into the relevant contention cell, analogously to steps (11) to (16).

Since the time at which the processing of a task must be concluded at the latest is already determined during the generation of the contention cell CC for this task, the content of the contention unit PCU changes only if a contention cell CC is newly generated or erased, or if the state of an existing contention cell CC changes. For example, through an alteration of the f-bits of a contention cell, a suppression or resumption of participation in the comparison of the t-bits by the arbiter A can be effected, or, through an alteration of the t-bits of an existing contention cell CC, the time sequence information of the allocated task can be altered. In other words, the priority allocation to the tasks awaiting processing can be altered only if the content of the contention unit alters. All alterations at the contention unit are realized by the hardware, by means of a write access to the contention unit. That is, a comparison is performed of the t-bits of all occupied cells in the contention unit in order to determine which contention cell contains the smallest time sequence information, and, if warranted, the transmission of an interrupt request to the processor CPU must be carried out only if a write access to the contention unit has taken place. At all other times, the contention unit PCU and the arbiter A can be used for other purposes.

Figure 3:
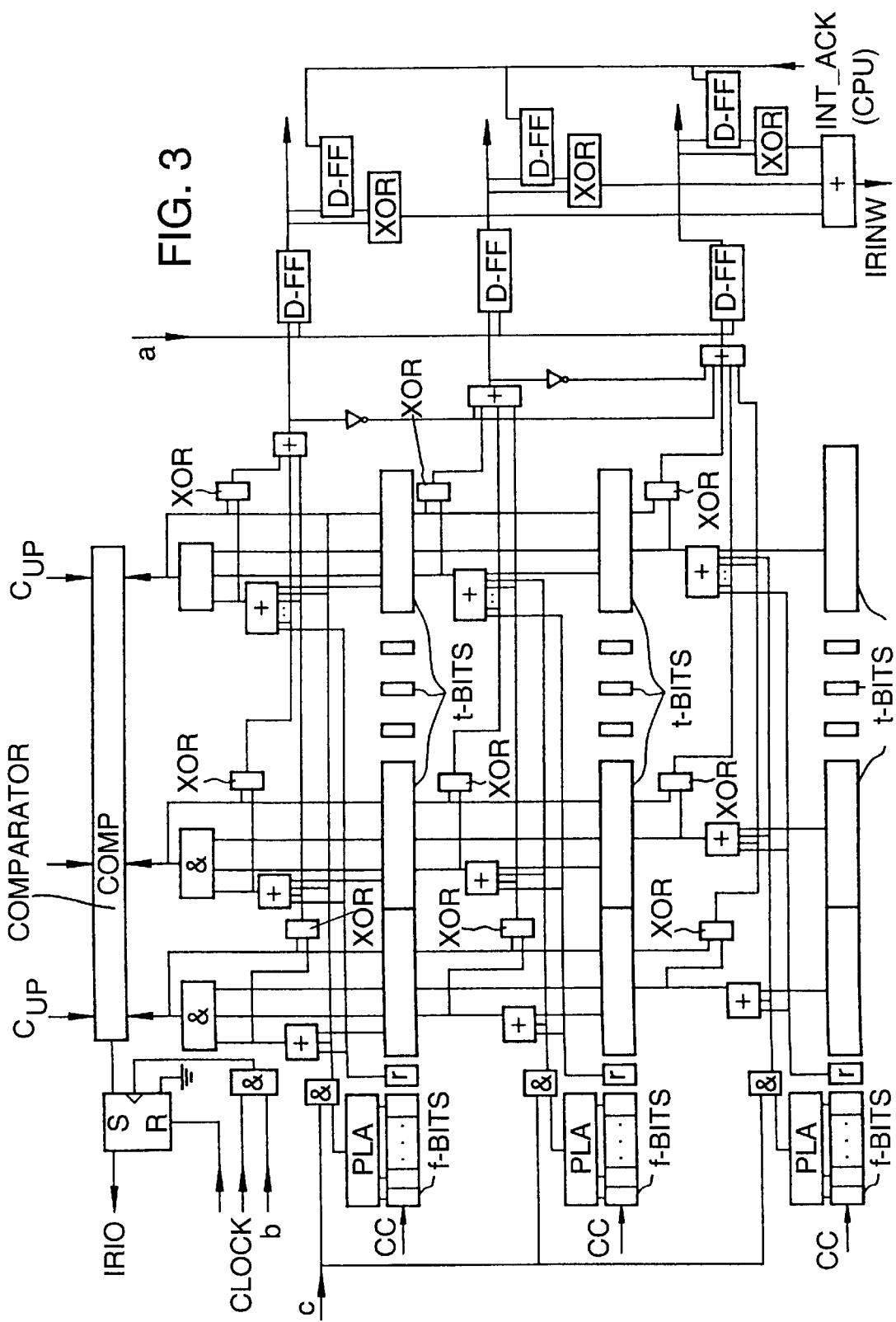
FIG. 3 is a schematic detail representation of the arbiter of the contention unit.
Figure 4:
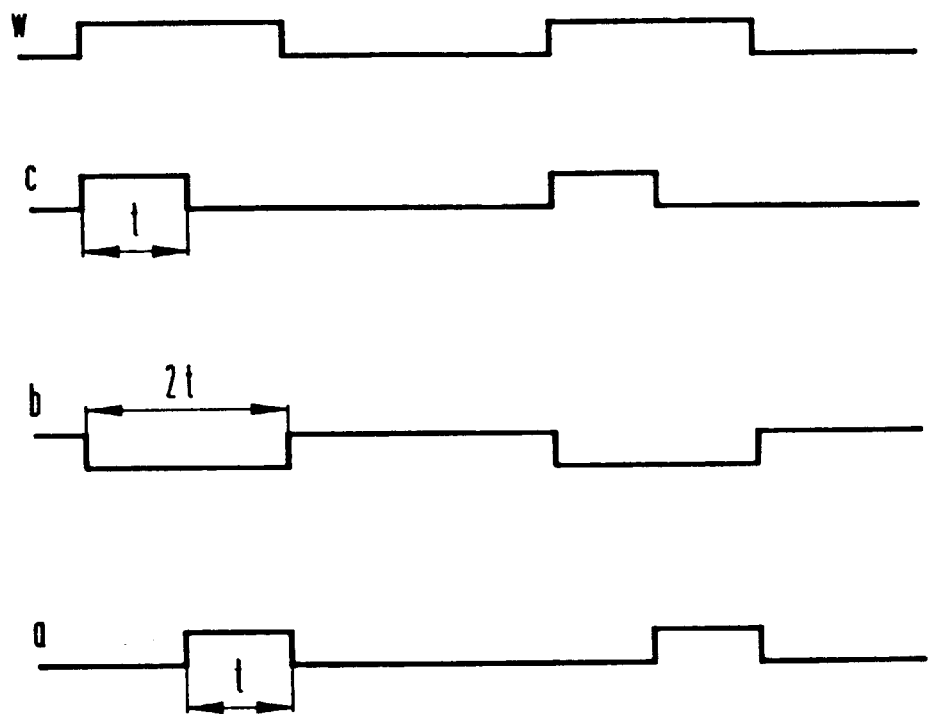
FIG. 4 shows a typical time curve of different signals of the arbiter.

With reference to FIGS. 3 and 4, the logical design and the function of the arbiter is discussed in more detail below, whereby in FIG. 3 the arbiter logic is shown in detail by means of the example of three contention cells having a plurality of f-bits, an r-bit, and a plurality of t-bits, while FIG. 4 shows typical time curves of different signals of the arbiter logic of FIG. 3. The i-bits of the contention cells are not shown in FIG. 3 for reasons of clarity, since they have no influence on the function of the arbiter.

As a reaction to a write signal at the line w of the contention unit, a signal is set to high for a determined time at the line c. The time duration for the high signal is dependent on the signal delay within the arbiter. The signal of the line c is logically connected with the output of a logical function PLA (Program Logical Array) via an AND gate. The function PLA is a logical connection of all f-bits of a contention cell CC, and indicates by means of its output (0 or 1) whether or not this contention cell is currently participating in the comparison of the t-bits by the arbiter. The high signal at c brings it about that the output at the dynamic flip-flops D-FF of the arbiter A acquires only those cells CC of the contention unit that are occupied and whose f-bits (PLA function) allow participation in this comparison. In addition, it can be learned from FIG. 3 that the output can be zero only of that flip-flop D-FF that is allocated to the cell having the smallest time sequence information. The just-specified operating mode of the arbiter serves to determine which of the occupied (r-bit=occupied) and active (PLA function=1) contention cells contains the shortest time sequence information, and thus receives the highest priority according to the EDF principle. This operating mode of the arbiter is called priority allocation for short in the following.

At all other times, i.e. if no write access to the contention unit takes place, the signal c is set to low. The low signal at c brings it about that all occupied cells of the contention unit participate in the comparison of the time sequence information contained in the t-bits, independently of the state indicated by the PLA function. The result of this comparison is loaded into an n-bit-wide comparator COMP and is compared with the value of the counter $C_{UP}$. As soon as the value of the counter is larger than the just-determined smallest time sequence information of all occupied cells of the contention unit, the output of the comparator COMP changes from low to high. This means that the processor cannot process a task at its intended time, and the arbiter A sends an interrupt request overloading indication IRIO to the processor CPU, in order to indicate this state to the processor. Due to the fact that all the cells entered in the contention unit are participating in this comparison, the maintaining of the time sequence information contained in the inactive contention cells is additionally monitored in a particularly simple fashion, which information is for the time being not admitted for processing, due e.g. to an inter-task communication. This operating mode of the arbiter is called overloading display for short in the following.

FIG. 4 shows the temporal curves of the different signals of the arbiter A of FIG. 3 for the two above-described modes of operation (priority allocation or, respectively, overloading display). If a write access to one of the contention cells is supposed to take place, the line w is set to high. With the leading edge of the signal at w, the arbiter goes into the operating mode for priority allocation, in which a comparison of the time sequence information takes place only of those cells that are not excluded from this comparison by the result of the PLA function. For this purpose, a high signal is applied to the line c simultaneously with the high signal on the line w, in order to activate the working of the f-bits. This high signal at c is applied for the time duration t, which is the time duration required for a write access to a contention cell plus the signal delay due to the arbiter logic. After a further time period t, i.e. with the trailing edge of the signal at the line c, a signal is set to high at the line a, in order to latch the result of the comparison of the t-bits of all admitted cells, obtained by means of the logical connection shown in FIG. 3, into a respective D-FF of the arbiter. If the result of the logical connection of the flip-flop D-FF of the arbiter A changes, an interrupt request is directed to the processor CPU on the line IRINW. In order to avoid the influencing of the operating mode for the overloading display by the priority allocation, a line b is simultaneously (i.e., likewise at the leading edge of the high signal at the line c and for the time duration 2t) set to low, which blocks the clock that latched the result of the comparator COMP into a flip-flop RS-FF provided for the overloading display. After expiration of the time period t, this blocking is removed by the line b.

At the leading edge of the signal at the line b, the arbiter A again enters the operating mode for the overloading display, in which a periodic comparison of all occupied cells of the contention unit takes place independently of the state of the cells indicated by the f-bits (PLA function). This is realized by means of the signal low at the line c. The blocking of the clock with which the result of the comparator COMP (high or low) is latched into the flip-flop RS-FF is removed by means of a high signal at the line b. In order to prevent this operation mode from influencing the priority allocation, it is ensured by means of a low signal at the line a that in the overloading display operating mode no output of the arbiter logic can be latched into the flip-flops D-FF.

The logical connection of the individual bits of the contention cells by the arbiter logic, shown in detail in FIG. 3, can be understood on the basis of the drawing by one skilled in the art, and is not explained in more detail below.

If, in the above-specified operating mode of priority allocation of the arbiter A, it is determined during a comparison of the time sequence information that the just-determined contention cell with the smallest time sequence information is different than in the previously executed comparison, i.e. if a new winner cell CC of the contention unit PCU has been determined, the following further steps are carried out (cf. FIG. 2):

(21) An interrupt is transmitted to the processor CPU on the interrupt line IRINW, in order to bring about a task change.

(25) As a reaction to the interrupt request in (21), a reserved code is applied in the c segment of the CPU address bus by the processor CPU, e.g. 0x00, in order to indicate that the processor CPU wishes to read the i-bits of the winner cell. The address referring to the i-bits of the winner cell is applied to the s segment of the address bus.

(26) In case the ACCESS DISABLE signal is not applied to the transmission unit ADAWSG (the contention unit is currently being used by the initiation unit), the READ signal is set at the R/W input of this unit, and the i-bits of the winner cell are read. The content of the i-bits is used to find out the information in the task control block of the data processing equipment required for the processing of the associated task. In the same way, the address of the winner cell is read, since it may be required later for an inter-task communication in which the f-bits of the contention cell are modified.

If in the overloading display operating mode it is determined, by means of a high signal at the output of the comparator COMP, that a task cannot be timely processed, the following further steps are carried out:

(31) An interrupt request is transmitted to the processor CPU on the interrupt line IRIO, in order to indicate an overload state.

(32) a predetermined code (e.g. 0xFF) is applied to the c segment of the address bus in order to indicate that the cell that triggered the overloading signal is now to be processed. In order to determine which cell triggered the overloading signal, the signal interrupt acknowledge INT_ACK is used to latch the result of the arbiter into the flip-flops D-FF. At this time the line IRINW is blocked.

(33) The i-bits of the cell that triggered the overloading signal are read by the ADAWSG, and

(34) the READ signal is set at the R/W line in order to transmit these i-bits to the processor CPU, where they are analyzed by a pre-loading-handling-interrupt routine.

This routine carries out all required treatments; for example, if it is determined that the task for the processing of the associate process requires longer than $2^n$ clock periods (n=width of the counter $C_{UP}$), the interrupt routine will newly calculate the t-bits of the allocated contention cell, so that the remaining code can be further processed according to EDF (cf. FIG. 3).

For the modification of the t-bits of a contention cell, the following steps are carried out:

(35) the modified content of the t-bits is applied to the CPU data bus.

(36) the WRITE signal is set at the line R/W.

(37) the content of the t-bits is loaded into the adder register.

(38) the content of the t-bits is added with the content of the counter $C_{UP}$ to form an n+1 bit result, which is written into the t-bits of the corresponding contention cell.

In this way, even an endless loop can for example be realized within this architecture.

The n-bit counter $C_{UP}$ will display an overflow after $2^n \cdot p$ time units. This overflow is used to reset the MSB (Most Significant Bit) of the t-bits of all occupied contention cells CC, after which the absolute time information of all cells of the contention unit PCU is again synchronized with the counter $C_{UP}$.

A plurality of f-bits is provided in each contention cell CC in order to enable an intertask communication, such as for example semaphore, event flags or message boxes. A logical function PLA is defined by the f-bits, whose result (0 or 1) indicates whether or not the allocated cell of the contention unit PCU participates in the comparison of the t-bits by the arbiter A. In the following, procedural sequences are explained in more detail by means of the example of a semaphore and message box.

Semaphores can be managed by means of an array consisting of several structures of two elements each. Each structure is indexed by the semaphore identification. The first element of each structure of this array is a flag that indicates whether the semaphore is occupied or not. The second element is a list that contains the indexes of those contention cells whose allocated tasks are waiting on this semaphore.

To set the semaphore with the identification id=i, the following procedural steps are carried out: if the first element of the ith structure indicates that the semaphore is not set, a value is allocated to this element indicating a set semaphore, and the task runs further. Otherwise, the cell index of the currently processed task is written into the list of the second element of the ith structure, and the allocated f-bit of this task is set. Whether the running task is now excluded from the comparison of the t-bits by the arbiter or not depends on the result of the logical function PLA, described above.

On the other hand, to reset the semaphore with the identification id=i, the following procedural steps are required: the finding out of the ith structure in the array, and, if the list of the second element is empty, the allocation of a value of the first element of this structure, indicating a reset semaphore; otherwise, resetting of the allocated f-bit in the contention cell, whose index is indicated by the first entry in the list of the second element of the ith structure.

In a similar way, messages can be exchanged between processes. Each message box supports two lists: a first list with cell indexes of processes that are waiting on a message, together with an address (=data pointer) at which the message is expected, and a second list with message data. The structures of the message boxes are likewise organized as an array. Each message box is indexed by a message box number.

If a process wishes to receive a message from a message box with the number m, it looks up the mth member of the array. If the list of message data is not empty, the first entry is taken from the list and copied to its own variable. The process can thus run further. If the list of the message data is however empty, the cell index of the process at the first position and the address (=data pointer) of a local variable where it will receive its message is entered at the second position of the first list. At this position, the process must wait on the message, and will set the corresponding f-bit of the allocated contention cell in order to exclude this process from the next comparison of the t-bits, so that a change of task is automatically carried out.

If a process wishes to transmit a message into the message box having the number m, it will likewise look up the mth member of the array. If the cell index is not empty, the message is copied to the position indicated by the data pointer at the second position of the first list. The f-bit of the associated contention cell is subsequently reset, in order to enable a participation of this cell in the next following comparison of the t-bits. If however the cell index is empty, the data are simply entered into the message data list of the mth structure.

An advantage of the apparatus of the invention is thus, among other things, that the apparatus PICU also takes over the management of semaphores and mailboxes, in addition to the dynamic priority allocation and overloading display. In this way, the operating system can be further relieved, and the utilization of processor capacity increased.

Finally, it is however to be noted that the present invention is not limited to the specified exemplary embodiment. In place of the comparison of absolute time information by an arbiter, in an embodiment of an apparatus of the invention (not shown here) each contention cell is respectively realized by a binary, downwardly counting counter, in which the relative time sequence information of a process is entered, so that the time sequence information of each contention cell is reduced according to the clock rate of a downwardly counting counter. It is true that the manufacturing costs are somewhat higher due to the binary counters, but in smaller PICU apparatus this can however be compensated in that no adder register is required for the calculation of the absolute time information, and the arbiter logic can be constructed more simply.

Although various minor changes and modifications might be proposed by those skilled in the art, it will be understood that I wish to include within the claims of the patent warranted hereon all such changes and modifications as reasonably come within my contribution to the art.

I claim as my invention:

1. A method for processing of a plurality of tasks by a processor of a real-time data processing apparatus, in which each task is to be processed individually in a processor according to a dynamically allocated priority and within a predetermined time period, comprising the steps of:

for each task to be processed by the processor, generating an initiation cell having a plurality of t-bits that contain a time sequence information which indicates a time within which a processing of the respective task must be carried out, and a plurality of i-bits that contain an index information referring to a task control block in the data processing apparatus;

in order to log tasks on for processing, entering each initiation cell which has been produced independently from its priority to a free contention cell in a contention unit which is independent of the processor and which has a plurality of contention cells;

for defining a task which has to be executed next, after the entry of the initiation cells comparing the time sequence information in each of the initiation cells entered into the free contention cells in the contention unit in order to determine which task has a lowest time sequence information; and sending an interrupt signal to the processor in order to initiate processing of the determined task having the lowest time sequence information, provided that the determined task does not correspond with a previously determined task which is currently being processed by the processor.

2. The method according to claim 1 wherein the initiation cell is generated by a process initiation unit, containing an initiation cell, having t-bits pre-coded or initiated by the processor, for each admitted external event that can signal a task for processing by the processor.

3. The method according to claim 1 wherein for an internal task to be processed the t- and i-bits for a contention cell are generated by the processor and are entered into the contention unit.

4. The method according to claim 1 wherein an r-bit is provided in each cell of the contention unit indicating whether the cell is occupied or not, and wherein before the entering of an initiation cell into a cell of the contention unit the r-bit is checked in order to determine whether the cell is free or not.

5. The method according to claim 1 wherein a value of an upwardly counting counter is added to a relative time information contained in the t-bits of an initiation cell before the entering of this cell into a free cell of the contention unit, in order to generate an absolute time information that is entered into the t-bits of the contention cell.

6. The method according to claim 1 wherein a relative time information contained in the t-bits of an initiation cell is entered directly into a free cell of the contention unit, and wherein a content of the t-bits of all contention cells is reduced corresponding to a clock rate of a downwardly counting counter.

7. The method according to claim 1 wherein each cell of the contention unit contains f-bits that are provided for an intertask communication by means of which participation of a contention cell in the comparison of the time sequence information contained in the t-bits can be temporarily suppressed.

8. The method according to claim 1 wherein the comparison of the time sequence information of the contention cells is carried out only if a write access has taken place to the contention unit, which has modified a state of at least one contention cell.

9. The method according to claim 7 wherein independently of the state of the contention cells, a comparison of the time sequence information of all occupied contention cells is periodically further carried out in order to indicate an overloading as soon as it has been determined that a task was not processed within a time predetermined in the t-bits.

10. An apparatus for processing of a plurality of tasks within a predetermined time period in a processor according to a dynamically allocated priority, comprising:

means for generating for each task to be processed by the processor an initiation cell having a plurality of t-bits that contain a time sequence information which indicates a time within which a processing of the respective task must be carried out, and a plurality of i-bits that contain an index information referring to a task control block in the data processing apparatus;

means for entering each initiation cell which has been produced independently from its priority to a free contention cell in a contention unit independent of the processor and having a plurality of contention cells in order to log on tasks for processing;

means for comparing, after the entry of the initiation cells, the time sequence information in each of the initiation cells entered into the free contention cells in the contention unit in order to determine which task has a lowest time sequence information in order to define a task which has to be executed next; and means for sending an interrupt signal to the processor in order to initiate processing of the determined task having the lowest time sequence information, provided that the determined task does not correspond with a previously determined task which is currently being processed by the processor.

11. An apparatus according to claim 10 wherein the means for the generation of an initiation cell is a process initiation unit in which an initiation cell having t-bits that are pre-coded or initiated by the processor is provided for an external task to be processed.

12. An apparatus according to claim 11 wherein the means for generating an initiation cell is the processor itself.

13. An apparatus according to claim 10 wherein the means for the comparison of the time sequence information contained in the t-bits of the contention cells comprises an arbiter.

14. An apparatus according to claim 10 further including means for checking an r-bit of the contention cells which indicates whether it is occupied or not.

15. An apparatus according to claim 14 further including means for setting and resetting f-bits of each cell of the contention unit which are provided for an intertask communication by which participation of a contention cell in the comparison of the time sequence information contained in the t-bits can be temporarily suppressed.

16. An apparatus according to claim 10 further including means for adding a content of an upwardly counting counter to a relative time information contained in the t-bits of an initiation cell in order to generate an absolute time information that is entered into the t-bits of the allocated cell of the contention unit.

17. An apparatus according to claim 10 further including means for reduction of a relative time information contained in the t-bits of each contention cell corresponding to a clock rate of a downwardly counting counter.

18. An apparatus according to claim 16 further including means for comparison of a smallest time sequence information of all occupied contention cells with the upwardly counting counter in order to indicate an overloading in case a value of the smallest time sequence information is smaller than a value of the upwardly counting counter.

19. An apparatus according to claim 18 further including means for indication of an overloading state in case a value of the smallest time sequence information has reached a value zero.

20. An apparatus according to claim 18 further including means for blocking of the overloading indication.

* * * * *